(12) United States Patent
Nakamura (10) Patent No.: US 11,085,668 B2
(45) Date of Patent: Aug. 10, 2021

(54) SOLAR ENERGY UTILIZATION SYSTEM

(71) Applicant: YAZAKI ENERGY SYSTEM CORPORATION, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 202 days.

(21) Appl. No.: 16/453,219

(22) Filed: Jun. 26, 2019

(65) Prior Publication Data

US 2019/0316811 A1    Oct. 17, 2019

Related U.S. Application Data

(63) Continuation of application No. PCT/JP2017/041716, filed on Nov. 20, 2017.

(30) Foreign Application Priority Data

Dec. 27, 2016    (JP) .............................. JP2016-252457

(51) Int. Cl.
   *F24S 10/70*    (2018.01)
   *F24S 20/63*    (2018.01)

(52) U.S. Cl.
   CPC .............. *F24S 20/63* (2018.05); *F24S 10/70* (2018.05)

(58) Field of Classification Search
   CPC ................................. F24S 20/63; F24S 10/70
   USPC .......................... 126/569, 591, 607; 165/48.2
   See application file for complete search history.

(56) References Cited

U.S. PATENT DOCUMENTS

| | | | | |
|---|---|---|---|---|
| 3,990,635 | A | * | 11/1976 | Restle ..................... F24S 20/63 126/591 |
| 4,014,313 | A | * | 3/1977 | Pedersen ................. F24S 20/66 126/660 |
| 4,062,347 | A | * | 12/1977 | Jensen .................. F24D 11/007 126/591 |
| 4,527,548 | A | | 7/1985 | Gustafson |
| 4,615,381 | A | * | 10/1986 | Maloney ................. F24S 60/30 165/48.2 |

(Continued)

FOREIGN PATENT DOCUMENTS

| | | |
|---|---|---|
| EP | 0 978 620 A2 | 2/2000 |
| GB | 2 273 151 A | 6/1994 |

(Continued)

OTHER PUBLICATIONS

International Search Report dated Dec. 26, 2017 by the International Searching Authority in counterpart International Patent Application No. PCT/JP2017/041716. (PCT/ISA/210).

(Continued)

*Primary Examiner* — Avinash A Savani
(74) *Attorney, Agent, or Firm* — Sughrue Mion, PLLC (57) ABSTRACT

A solar energy utilization system includes a solar heat collector that is mounted to a glass surface of a building from the interior and that heats a heating medium by heat energy obtained by taking in solar energy, and an inner glass that is provided on the solar heat collector on the interior side of the building and that uses the heating medium from the solar heat collector on the interior side. A far-infrared cut-off process is applied to the inner glass so that both the absorptivity and emissivity and transmittance of far-infrared rays with a wavelength of at least 9 μm to 10 μm are 20% or less.

5 Claims, 3 Drawing Sheets

(56) References Cited

U.S. PATENT DOCUMENTS

| | | | | |
|---|---|---|---|---|
| 5,221,363 | A | * | 6/1993 | Gillard ...................... E06B 9/32 |
| | | | | 136/248 |
| 5,524,381 | A | * | 6/1996 | Chahroudi ............. A01G 9/243 |
| | | | | 47/17 |
| 2012/0279147 | A1 | | 11/2012 | Kapany |
| 2013/0074918 | A1 | * | 3/2013 | Jeong ...................... C03C 27/06 |
| | | | | 136/256 |
| 2015/0083195 | A1 | | 3/2015 | Gilbert |
| 2015/0167298 | A1 | | 6/2015 | Reutter |
| 2016/0011348 | A1 | * | 1/2016 | Hirakoso ............... G02B 5/208 |
| | | | | 359/359 |

FOREIGN PATENT DOCUMENTS

| | | |
|---|---|---|
| JP | 58-197781 A | 11/1983 |
| JP | 6-147650 A | 5/1994 |
| JP | 2010-144375 A | 7/2010 |
| WO | 2015/017879 A1 | 2/2015 |

OTHER PUBLICATIONS

Written Opinion dated Dec. 26, 2017 by the International Searching Authority in counterpart International Patent Application No. PCT/JP2017/041716. (PCT/ISA/237).

\* cited by examiner

FIG. 3

SOLAR ENERGY UTILIZATION SYSTEM

CROSS REFERENCE TO RELATED APPLICATIONS

This application is a continuation of PCT application No. PCT/JP2017/041716, which was filed on Nov. 20, 2017 based on Japanese patent application 2016-252457 filed on Dec. 27, 2016, whose contents are incorporated herein by reference. Also, all the references cited herein are incorporated as a whole.

BACKGROUND OF THE INVENTION

1. Technical Field

The present invention relates to a solar energy utilization system.

2. Background Art

In the related art, techniques have been proposed in which a solar cell that takes in solar energy to generate electric energy, and a solar heat collector that heats a heating medium with thermal energy obtained by capturing solar energy are arranged in a space in a two-layer structure glass (refer to Patent Literatures JP-A-S58-197781, JP-A-H6-147650, and JP-A-2010-144375). According to these, while taking in sunlight into the interior through window glass, electric energy and thermal energy can be obtained by using sunlight energy, and energy saving can be achieved.

SUMMARY

In the techniques disclosed in Patent Literatures JP-A-S58-197781, JP-A-H6-147650, and JP-A-2010-144375, since it is necessary to take in a lot of solar energy to obtain a large amount of electrical energy and thermal energy, it is preferable to use glass having a high natural light transmittance as the two-layer structure glass. However, the glass having a high natural light transmittance easily allows transmission of far-infrared rays from the interior to the outdoor and is inferior in terms of heat insulation of the interior. Therefore, there is room for improvement in energy saving performance.

The present invention has been made to solve such a problem, and an object thereof is to provide a solar energy utilization system capable of improving energy saving performance.

Solution to Problem

A solar energy utilization system according to the present invention includes an energy receiver, an interior side transparent member, and an energy utilization device. The energy receiver is provided inside a transparent part of a building and takes in solar energy to obtain at least one of electrical energy and thermal energy. The interior side transparent member is provided on an interior side of a building with respect to the energy receiver, and the energy utilization device uses energy from the energy receiver on the interior side. Furthermore, the interior side transparent member is subjected to a far-infrared cut-off process so that both the absorptivity/emissivity and a transmittance of far-infrared light with at least a wavelength of 9 μm to 10 μm are 20% or less.

According to the present invention, since the interior side transparent member subjected to the far-infrared cut-off process is provided, it is difficult to radiate far-infrared rays from the interior side to the outdoor without inhibiting the arrival of solar energy to the energy receiver. Therefore, the interior heat insulation can be improved while securing the availability of solar energy, and the energy saving performance can be improved.

DETAILED DESCRIPTION OF EMBODIMENTS

Hereinafter, the present invention will be described according to preferred embodiments. The present invention is not limited to these embodiments described below, and can be appropriately modified within the range not departing from the spirit of the present invention. In the embodiment shown below, the illustration and description of a part of the configuration are omitted in some places, but as for the details of the omitted techniques, it goes without saying that known or well-known techniques are appropriately applied within the range where the contradiction does not occur with the contents described below.

Figure 1:
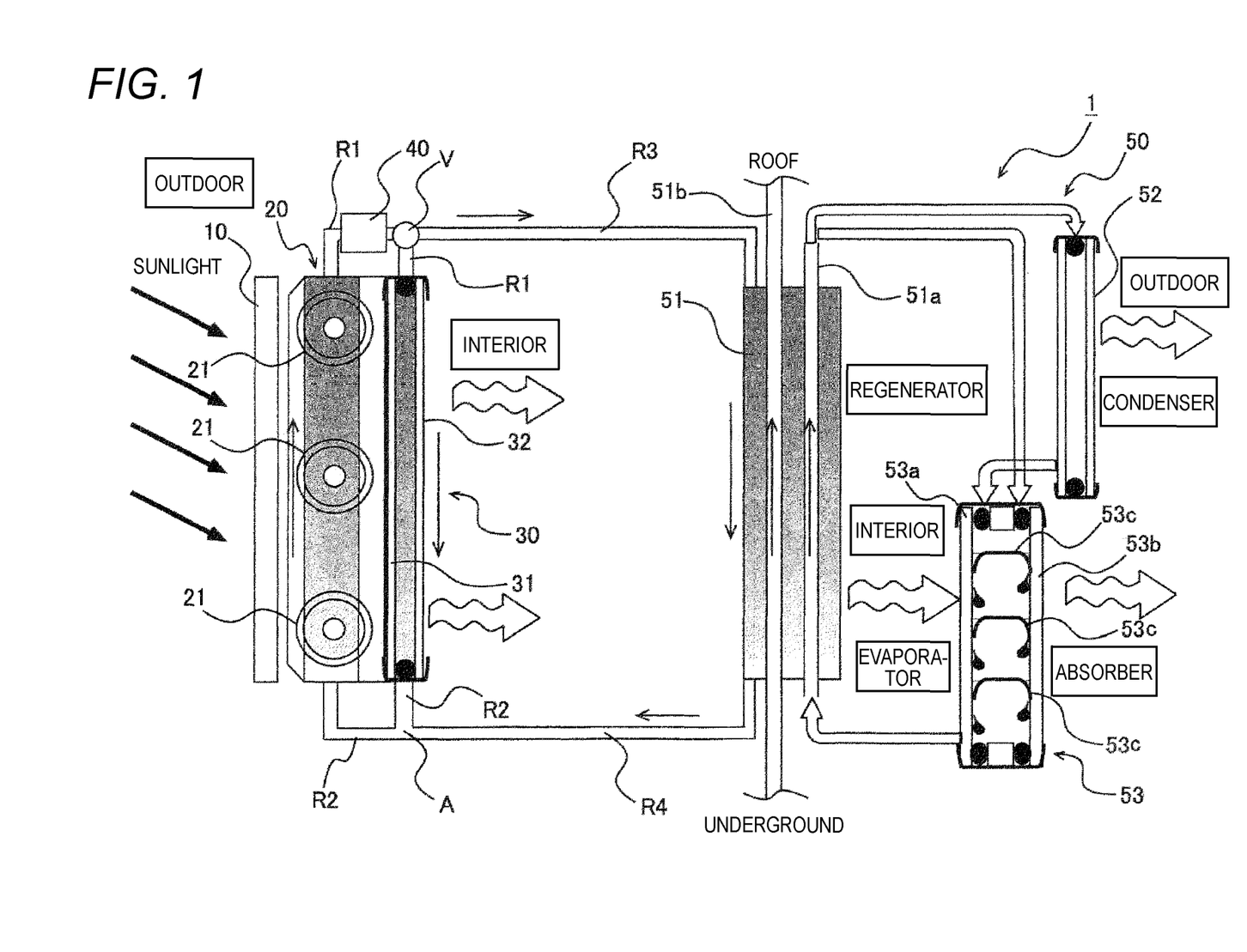
FIG. 1 is a configuration diagram showing a solar energy utilization system according to a first embodiment of the present invention.

FIG. 1 is a configuration diagram showing a solar energy utilization system according to a first embodiment of the present invention. In FIG. 1, an example in which the solar energy utilization system is used in the middle floor of a high-rise building and the like is shown, but the solar energy utilization system is not limited to the case of being used in the middle floor of the building, and may be used in the upper floor and the lower floor or may be used in a middle and low-rise building or a detached house.

As shown in FIG. 1, a solar energy utilization system 1 includes an outer glass (transparent part) 10, a solar heat collector (energy receiver) 20, an inner glass (interior side transparent member, energy utilization device) 30, first and second pipes R1 and R2, and a pressure absorbing portion 40.

The outer glass 10 is a plate-like glass member installed in a building and is preferably a transmission type glass having a transmittance of 80% or more for natural light. The outer glass 10 is not limited to the transmission type glass and an existing heat-absorbing glass or heat-reflecting glass installed in a high-rise building may be used. The outer glass 10 is a part of the building and withstands wind pressure and meets building standards.

The solar heat collector 20 obtains thermal energy by using solar energy supplied to the interior side through the outer glass 10 and heats a heating medium (antifreeze such as ethylene glycol) by thermal energy obtained using solar energy. The solar heat collector 20 has a horizontal blind type structure including a plurality of vacuum pipes 21 extending in the horizontal direction. The vacuum pipe 21 includes a transparent outer pipe, and an inner pipe subjected to a selective absorption process of sunlight, and for example, has a structure for heating the heating medium flowing in a U-shaped heating medium passage inserted into the inner pipe.

The solar heat collector 20 is not limited to the vacuum pipe type having the plurality of vacuum pipes 21 but may be of another type such as one having a heat collecting fin. Further, the vacuum pipe 21 and the heat collecting fin are not limited to the horizontal blind type, and a vertical blind type or a semi-transmission type may be employed. Regarding a window at an angle that is not optimized to the altitude of the sun, such as a vertical plane or horizontal plane, a horizontal blind type window is preferable in terms of the cost and taking-in of sunlight into the interior since the horizontal blind type window has higher thermal efficiency than a vertical blind type window, the number of vacuum pipes 21 and the like can be reduced. In a case of a vacuum pipe type having a plurality of vacuum pipes 21, it is possible to obtain a stable heat collection effect by the circular inner pipes even if there is a difference in the altitude of the sun between summer and winter.

The inner glass 30 is a plate-like glass member provided on the solar heat collector 20 in the interior side of the building. Particularly, in the embodiment, the inner glass 30 has a two-layer structure capable of introducing a heating medium inside through the first pipe R1, and functions as a radiant heating panel (energy utilization device) that heats the interior using the heating medium inside.

In detail, a first glass (transparent member) 31 of the inner glass 30 of the two-layer structure on the solar heat collector 20 side is subjected to a low radiation process (far-infrared cut-off process) by coating the surface, which is not in contact with the heating medium, with a film of a predetermined metal or the like. Through this process, both the absorptivity and emissivity and the transmittance of far-infrared rays with at least a wavelength of 9 μm or longer and to 10 μm or shorter are 20% or less in the first glass 31.

In contrast, a second glass (transparent member) 32 of the inner glass 30 of the two-layer structure on the interior side is not subjected to a low radiation process. Therefore, the absorptivity and emissivity and the transmittance of the second glass 32 are at least higher than the absorptivity and emissivity and the transmittance of the first glass 31, and specifically, the sum of the absorptivity and emissivity and the transmittance with respect to far-infrared rays is 80% or more. Thus, although far-infrared rays from the heating medium are cut by the first glass 31 and thus hardly radiated to the outdoor side, the far-infrared rays are easily radiated to the indoor side through the second glass 32. As a result, the inner glass 30 functions as a radiant heating panel with little wasteful radiation. The first glass 31 plays a role of suppressing not only the far-infrared rays from the heating medium but also the far-infrared rays from the interior to be radiated to the outdoor, that is, a decrease in the interior temperature.

Here, the inner glass 30 is provided at the approximately same height as the solar heat collector 20. Further, the first pipe R1 connects the upper part of the solar heat collector 20 and the upper part of the inner glass 30 and the second pipe R2 connects the lower part of the solar heat collector 20 and the lower part of the inner glass 30. Therefore, the heating medium cooled by the inner glass 30 reaches the solar heat collector 20 through the second pipe R2, is heated by the solar heat collector 20, and is returned to the inner glass 30 through the first pipe R1. That is, natural circulation can be performed.

Here, the expression "provided at the approximately same height as" means that the inner glass 30 is installed so as to be at least partially included in the height range from the upper end to the lower end of the solar heat collector 20. Thus, natural circulation can be performed when most of the inner glass 30 is located at the height from the upper end to the lower end of the solar heat collector 20, and in the case where the inner glass 30 is not located at such a position and natural circulation cannot be performed, it is not necessary to increase the output of a pump for heating medium circulation.

The pressure absorbing portion 40 is a so-called expansion vessel, which prevents the internal pressure of the inner glass 30 from rising due to the thermal expansion of the heating medium and causing damage. The pressure absorbing portion 40 is provided, for example, on the first pipe R1.

Figure 2:
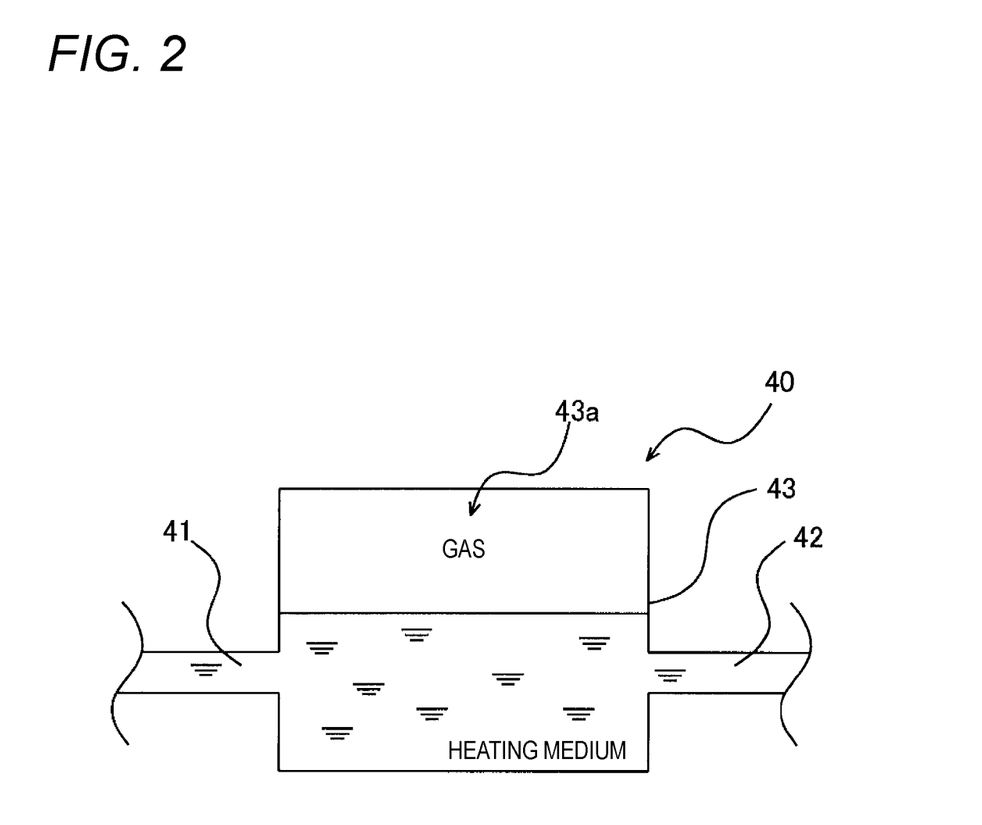
FIG. 2 is a detailed block diagram of a pressure absorbing portion shown in FIG. 1.

FIG. 2 is a detailed block diagram of the pressure absorbing portion 40 shown in FIG. 1. As shown in FIG. 2, the pressure absorbing portion 40 includes an inlet portion 41 connected to the solar heat collector 20, an outlet portion 42 connected to the inner glass 30, and a heating medium reservoir portion 43 arranged therebetween. The heating medium reservoir portion 43 is a container-like portion whose internal volume is larger than the inlet portion 41 and the outlet portion 42, and the lower part is filled with the heating medium, but the upper part is in a state where a gas 43a exists. Therefore, when the heating medium thermally expands, the gas 43a of the heating medium reservoir portion 43 is compressed, and an increase in the internal pressure of the inner glass 30 is suppressed. The pressure absorbing portion 40 may be a so-called open type cistern tank in which the gas 43a is open to the atmospheric pressure.

FIG. 1 is referred to again. As described above, the solar energy utilization system 1 can perform heating by using the inner glass 30 as a radiant heating panel. Further, the solar energy utilization system 1 includes a valve V, third and fourth pipes R3 and R4, and an absorption type refrigerator (energy utilization device) 50 in order to perform cooling.

The valve V is a three-way valve provided on the downstream side of the pressure absorbing portion 40 in the first pipe R1 and is capable of changing a route for supplying the heating medium from the solar heat collector 20 to the inner glass 30, and a route for supplying the heating medium to the third pipe R3. In the valve V, the route may be switched by a controller based on a signal from a temperature sensor that detects room temperature or heating medium temperature or may be switched manually. Further, the valve V may automatically switch the flow path of the heating medium according to the room temperature by techniques using bimetal, volume change of liquid in the capillary pipe, solid-liquid phase change, a shape memory alloy, and the like.

The absorption type refrigerator 50 includes a heat exchanger 51 that functions as a regenerator. The third pipe R3 is a pipe that connects the valve V and the upper part of the heat exchanger 51, and the fourth pipe R4 is a pipe that connects the lower part of the heat exchanger 51 and the second pipe R2 (the location indicated by reference sign A shown in FIG. 1). The heat exchanger 51 is provided at the approximately same height as the solar heat collector 20 similar to the inner glass 30. Further, the absorption type refrigerator 50 includes a condenser function portion 52 functioning as a condenser and an evaporative absorber function portion 53 functioning as an evaporator and an absorber.

Hereinafter, the absorption type refrigerator 50 will be described in detail. The heat exchanger 51 is provided with a flow pipe 51a through which an absorption liquid and a refrigerant flow. A dilute solution is introduced into the heat exchanger 51 as a regenerator, and is heated by the heating medium from the solar heat collector 20. Thus, the heating medium from the solar heat collector 20 is cooled and returned to the solar heat collector 20 again.

On the other hand, the dilute solution is separated into a concentrated liquid and a vapor refrigerant by heating, and the vapor refrigerant is introduced to the condenser function portion 52. Here, for example, the condenser function portion 52 has a two-layer structure similar to the inner glass 30. Further, for example, the condenser function portion 52 is installed to be directed to the outdoor. Therefore, the vapor refrigerant introduced into the condenser function portion 52 is cooled by the outside air and condensed to become a liquid refrigerant. The liquid refrigerant is introduced to the evaporative absorber function portion 53.

In addition, the concentrated liquid obtained by heating in the heat exchanger 51 is introduced to the evaporative absorber function portion 53. The evaporative absorber function portion 53 also has a double glass structure, one glass 53a functions as an evaporator, and the other glass 53b functions as an absorber. The liquid refrigerant is dropped along one glass 53a on the evaporator side, and the concentrated liquid is dropped along the other glass 53b on the absorber side.

In addition, the evaporative absorber function portion 53 includes a plurality of U-shaped members 53c which are U-shaped in cross section. The plurality of U-shaped members 53c are arranged between the two glasses 53a and 53b so as to form a substantially reverse U-shape, and are configured to prevent breakage of the evaporative absorber function portion 53 in a reduced pressure state. In addition, since the U-shaped member 53c is arranged in the opposite direction, the liquid refrigerant or concentrated liquid dropped along both glasses 53a and 53b is temporarily stored between the U-shaped member 53c and the glass face, and plays a role of improving the wettability to the glass surface.

The liquid refrigerant is evaporated and vaporized in the evaporative absorber function portion 53, is turned to refrigerant vapor, and is absorbed by the concentrated liquid. As a result, the dilute solution is discharged from the evaporative absorber function portion 53 and is supplied to the heat exchanger 51 as a regenerator. In addition, one glass 53a is directed to the interior and the interior air is cooled by the evaporation of the liquid refrigerant. The other glass 53b is directed to the outdoor and the absorption heat of the refrigerant vapor is removed by the outside air.

It is preferable that the absorption type refrigerator 50 is configured such that natural circulation can be performed by adjusting each location. However, there is no particular limitation thereto and a pump may be provided or other members omitted in the drawing may be added.

In addition, for example, a connection pipe 51b which connects the roof and the underground of the building penetrates the heat exchanger 51. Therefore, the heating medium in the heat exchanger 51 can exchange heat with cold water and hot water flowing in the connection pipe 51b. Here, in the embodiment, for example, the solar heat collector is installed on the roof of the building, the absorption type water cooling and heating machine is installed in the underground, and thus the corridors and common areas of the building are cooled or heated using these devices. The connection pipe 51b connects the solar heat collector on the roof and the absorption type water cooling and heating machine in the underground. Further, the connection pipe 51b penetrates the heat exchanger 51 in each floor. Therefore, the heating medium flowing in the connection pipe 51b can be transferred to the solar heat collector on the roof by being raised by heating of the heat exchanger 51. Thus, the heat exchanger 51 also functions as a pump for transferring the heating medium from the absorption type water cooling and heating machine in the underground to the solar heat collector on the roof while raising the temperature of the heating medium.

In addition, although not shown in the drawing of the first embodiment, the solar energy utilization system 1 according to this embodiment may be provided with a floor heating device (energy utilization device). Since the floor heating device is provided on the floor, the floor heating device is located below the solar heat collector 20. Therefore, the floor heating device may not be provided at the approximately same height as the solar heat collector 20 in many cases. Thus, when the natural circulation of the heating medium is performed, the inner glass 30 of the two-layer structure may be further provided, the heating medium discharged from the inner glass 30 of the two-layer structure may be supplied to the floor heating device, and the heating medium discharged from the floor heating device may be returned to the lower end of the solar heat collector 20. Thus, by adding the floor heating device to the natural circulation process using the inner glass 30 of the two-layer structure, the natural circulation can be used as it is.

Next, the operation and effect of the solar energy utilization system 1 according to the embodiment will be described.

First, at the time of heating, the route for transferring the heating medium to the inner glass 30 is selected by the valve V. When sunlight is incident on the solar heat collector 20, the solar heat collector 20 uses the solar energy to heat the heating medium. The heating medium is raised by the heating and reaches the inner glass 30 through the first pipe R. In the inner glass 30, the heating medium passes through the inside of the second glass 32 and far-infrared rays are radiated to heat the interior. On the other hand, since the first glass 31 on the outdoor side is subjected to a low radiation process, the amount of the far-infrared rays to be radiated to the outdoor side is suppressed.

The heating medium cooled by the radiation of far-infrared rays moves downward in the inner glass 30, is discharged through the second pipe R2, and is returned to the solar heat collector 20. Here, the internal pressure of the inner glass 30 is increased by the heating medium expanded by heating in the solar heat collector 20 and the increase in the internal pressure is approximately absorbed by the gas 43a of the pressure absorbing portion 40 being compressed.

Thus, according to the solar energy utilization system 1 according to the first embodiment, since the inner glass 30 subjected to the low radiation process is provided, the far-infrared rays from the interior side can be made less likely to be radiated to the outdoor without blocking the solar energy reaching the solar heat collector 20. Therefore, the interior heat insulation can be improved while securing the availability of solar energy, and energy saving performance can be improved.

Particularly, the heat transmission coefficient of one existing window glass is generally about 6 W/(m$^2$·K), and compared with the heat transmission coefficient of the wall portion of about 0.5 W/(m$^2$·K) or lower, heat insulation is significantly poor. Therefore, in the case where the outer glass 10 is one existing window glass, although the heat transmission coefficient is far from 0.8 W/(m$^2$·K), which is the world standards of passive houses for windows, by adopting the configuration according to the present embodiment, a heat transmission coefficient close to the heat transmission coefficient required for passive houses can be obtained.

In addition, the inner glass 30 has a two-layer structure capable of introducing the heating medium inside, one glass 31 of the glasses 31 and 32 of the two-layer structure on the solar heat collector 20 side is subjected to the far-infrared cut-off process, and heat is radiated from the heating medium through the other glass 32. Thus, the inner glass 30 can be used as a radiant heating panel.

Since the inner glass 30 of the two-layer structure is arranged so as to be at least partially included in the height from the upper end to the lower end of the solar heat collector 20, the inner glass 30 and the solar heat collector 20 are arranged at the approximately same height. Thus, it is possible to perform natural circulation using heat collection with the solar heat collector 20 and heat dissipation with the inner glass 30 and even if a pump for heat medium circulation is installed, a high output pump is not necessary.

Further, in the first embodiment, if the solar heat collector 20 and the inner glass 30 are unitized, the installation work can be simplified by attaching the unit to the outer glass 10, for example.

Next, a second embodiment of the present invention will be described. A solar energy utilization system according to the second embodiment of the present invention is the same as that of the first embodiment, but the configuration is partially different from that of the first embodiment. Hereinafter, differences from the first embodiment will be described.

Figure 3:
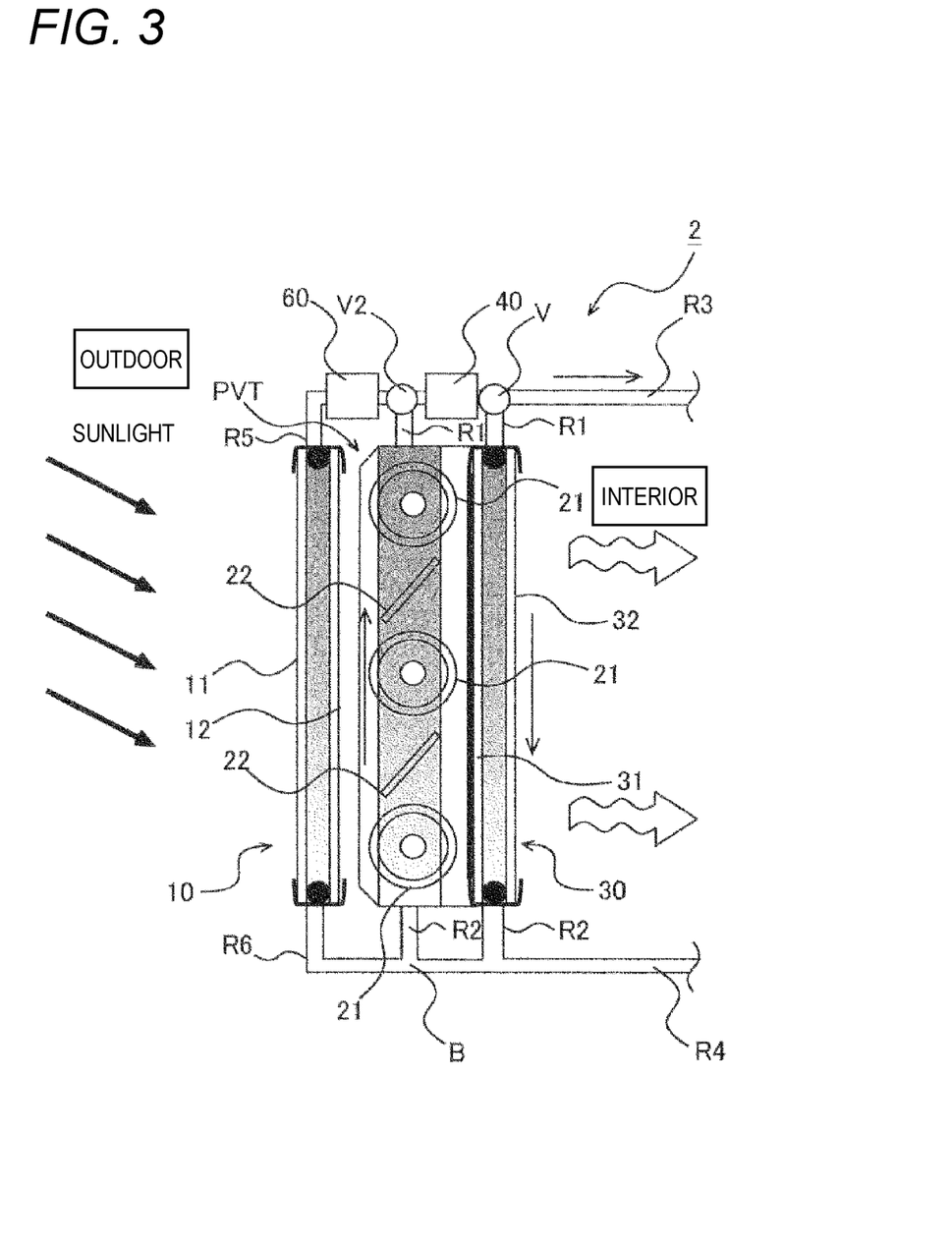
FIG. 3 is a diagram showing the configuration of a solar energy utilization system according to a second embodiment.

FIG. 3 is a diagram showing the configuration of a solar energy utilization system 2 according to the second embodiment. In FIG. 3, the absorption type refrigerator 50, the flow pipe 51a, and the connection pipe 51b are the same as those in the first embodiment, and thus the illustration thereof is omitted.

As shown in FIG. 3, the solar energy utilization system 2 according to the second embodiment includes, in addition to the constitutional members of the first embodiment, a second valve V2, fifth and sixth pipes R5 and R6, and a second pressure absorbing portion 60. Further, the solar energy utilization system 2 according to the second embodiment is different from the solar energy utilization system of the first embodiment in that the solar energy utilization system 2 includes a hybrid solar panel PVT instead of the solar heat collector 20 and the configuration of the outer glass (outdoor side transparent member) 10 is different.

The hybrid solar panel PVT includes a solar power generation panel 22 that takes in solar energy and generates electrical energy, in addition to the solar heat collector 20 (the plurality of vacuum pipes 21) shown in the first embodiment. The electrical energy generated by the solar power generation panel 22 is used for a device (energy utilization device) such as home appliances (not shown). The solar power generation panel 22 may be installed inside the vacuum pipe 21.

Further, in the second embodiment, like the inner glass 30, the outer glass 10 has a two-layer structure capable of introducing the heating medium inside. In the outer glass 10, a low radiation process is not performed on both the first glass 11 on the outdoor side and a second glass 12 on the interior side so as not to block the arrival of sunlight to the hybrid solar panel PVT.

The second valve V2 is a three-way valve provided on the hybrid solar panel PVT side with respect to the pressure absorbing portion 40 in the first pipe R1 and is capable of switching a route for supplying the heating medium from the hybrid solar panel PVT to the inner glass 30, and a route for supplying the heating medium to the outer glass 10. In the second valve V2, like the valve V, the route may be switched by a controller or may be switched manually. Further, the second valve V may be automatically switched by using bimetal and the like. In addition, when a hot water storage tank is provided in the second embodiment, switching may be performed according to the temperature of the hot water in the hot water storage tank.

The fifth pipe R5 is a pipe that connects the second valve V2 and the upper part of the outer glass 10, and the sixth pipe R6 is a pipe that connects the lower part of the outer glass 10 and the second pipe R2 (the location indicated by the reference sign B shown in FIG. 3). The second pressure absorbing portion 60 is the same as the pressure absorbing portion 40 and has a function of suppressing an increase in internal pressure.

For example, when the heating medium temperature reaches a predetermined temperature or higher (for example, 60° C. or higher), the second valve V2 in the solar energy utilization system 2 switches to the route for supplying the heating medium to the outer glass 10. Thus, the heating medium reaches the outer glass 10 from the hybrid solar panel PVT through the fifth pipe R5, and is cooled by outside air in the outer glass 10. The heating medium cooled by the outside air is returned to the hybrid solar panel PVT through the sixth pipe R6 again.

By circulating the heating medium between the hybrid solar panel PVT and the outer glass 10, the temperature of the heating medium can be reduced. Particularly, the heating medium in the outer glass 10 is continuously cooled by the outside air until the heating medium temperature reaches 60° C., and has a low temperature. Therefore, by circulating the heating medium between the hybrid solar panel PVT and the outer glass 10, the heating medium temperature can be reduced to lower than 60° C. relatively early. Thus, the failure of the solar power generation panel 22 having a heat resistant temperature of about 70° C. and the breakage of the vacuum pipe 21 (heat collecting portion) configuring the solar heat collector 20 can be prevented and a decrease in power generation efficiency by the solar power generation panel 22 can be suppressed.

In this manner, according to the solar energy utilization system 2 according to the second embodiment, similarly to the first embodiment, the energy saving performance can be improved, and a heat transmission coefficient close to the heat transmission coefficient required for passive houses can be obtained. In addition, the inner glass 30 can be used as a radiant heating panel. Further, natural circulation can be performed, and even if a pump for heat medium circulation is installed, a high output pump is not necessary.

In addition, according to the second embodiment, since the outer glass 10 having the two-layer structure capable of introducing the heating medium inside in the case where the temperature of the heating medium reaches a predetermined temperature or higher, the solar power generation panel 22 in which both the vacuum pipe 21 of the solar heat collector 20 and the solar heat collector 20 are installed can be prevented from causing failure by excessive heating of the heating medium, and a decrease in power generation efficiency by the solar power generation panel 22 can be suppressed.

Although the present invention has been described based on the embodiments, the present invention is not limited to the embodiments, and modifications may be made within the range not departing from the spirit of the present invention and other techniques may be combined as appropriate within the possible range. Further, known or well-known techniques are appropriately combined within the possible range.

For example, in the embodiment, the inner glass 30 has a two-layer structure and functions as a radiant heating panel to heat the interior, but is not limited thereto. The glass may be a single layer structure glass member subjected to a low radiation process and may have a configuration in which the heating medium from the solar heat collector 20 is used in the absorption type refrigerator 50 or the energy utilization device for floor heating or the like.

In the embodiment, the heating medium is supplied to the inner glass 30 which functions as a radiant heating panel, or the regenerator (heat exchanger 51) of the absorption type refrigerator 50, but is not limited thereto. For example, the heating medium may be supplied to the hot water storage tank to raise the temperature of the hot water storage tank, or the water from the water pipe may be heated by the solar heat collector 20 and supplied to the water heater. Particularly, the obtained heat quantity that exceeds the heating demand and the cooling demand may be supplied to the hot water storage tank, and the heat may be exchanged with the housing of the building (where the housing is the heat storage layer).

Further, the inner glass 30 or the outer glass 10 of the second embodiment may be reinforced with a rib or a partition as needed as a measure against water pressure. In addition, it is not preferable to configure one inner glass 30 and the outer glass 10 according to the second embodiment in a plurality of floors in terms of water pressure, the members are preferably formed on every floor.

In addition, the solar heat collector on the roof and the absorption type water cooling and heating machine in the underground are related to the entire building, the solar energy utilization systems 1 and 2 according to the embodiments are provided in each floor. Thus, for example, a case where the solar energy utilization systems 1 and 2 are properties owned by tenants for each floor may be considered. In this case, since the heat quantity obtained by the solar heat collector 20 is applied to cold water or warm water flowing in the connection pipe 51b through the heat exchanger 51, it is preferable to appropriately install a calorimeter and measure how much heat quantity is applied to cold water and warm water flowing in the connection pipe 51b. Thus, for example, it is possible to use the system to buy and sell the heat.

In the above embodiment, when the solar energy is not sufficient, the heating medium may be heated by obtaining the heat quantity from the connection pipe 51b and the heated heating medium may be supplied to the inner glass 30 to perform heating. Further, the heat quantity may be obtained from the connection pipe 51b and used in the absorption type refrigerator 50 again.

In addition, the inner glass 30 may be configured as a sliding window type (two sliding windows). Thus, this is because that since the inner glass 30 can be moved horizontally similarly to the sliding window, the surface subjected to the low radiation process can be reduced to half by moving the two sliding windows to be overlapped to each other, and the interior heat can be released to the outdoor.

In addition, the solar energy utilization system 1 according to the first embodiment includes the solar heat collector 20, but is not limited thereto. The solar energy utilization system may include the solar power generation panel 22 or the hybrid solar panel PVT. Further, the solar energy utilization system includes the hybrid solar panel PVT in the second embodiment, but in a case of a configuration including the solar heat collector 20, the hybrid solar panel PVT may not be used.

Further, in the second embodiment, a part of the inner pipe of the vacuum pipe 21 is constituted of a white high reflection plate and when the temperature of the heating medium reaches 60□C or higher, the whole of the inner tube or vacuum pipe 21 may be rotated to expose the white high reflection plate to sunlight. Thus, an increase in heat medium temperature can be suppressed by reflecting the sunlight, the failure of the solar power generation panel 22 can be prevented, and a decrease in the power generation efficiency can be suppressed.

In addition, in the solar energy utilization system 2 according to the second embodiment, the outer glass 10 is a part of the building, but is not limited thereto. The outer glass 10 may be a single layer glass already installed in a high-rise building and may have a configuration in which another outer glass 10, the hybrid solar panel PVT, and the inner glass 30 are provided with respect to this single layer glass from the inside in this order.

Further, in the embodiment, the inner glass 30 and the outer glass 10 are not limited to the case where the glass is formed of a so-called glass member, and a transparent member including a transparent resin such as polycarbonate may be used.

Here, the features of the embodiments of the solar energy utilization system according to the present invention described above will be briefly summarized and listed in the following [1] to [4].

[1] A solar energy utilization system including:
an energy receiver (solar heat collector 20) that is provided inside with respect to a transparent portion (outer glass 10) of a building and takes in solar energy to obtain at least one of electrical energy and thermal energy;
an interior side transparent member (inner glass 30) that is provided on the interior side of the building with respect to the energy receiver; and
an energy utilization device (absorption type refrigerator 50) using energy from the energy receiver in the interior side,
in which the interior side transparent member is subjected to a process so that both an absorptivity and emissivity and a transmittance of far-infrared rays with at least a wavelength of 9 µm or longer and to 10 µm or shorter are 20% or less.

[2] The solar energy utilization system according to [1],
in which the energy receiver is a solar heat collector (20) that takes in solar energy and heats a heating medium to obtain thermal energy,
the interior side transparent member is a transparent member having a two-layer structure capable of introducing the heating medium from the solar heat collector inside, a transparent member of the two transparent members on the solar heat collector side is subjected to the process and is used as the energy utilization device that radiates far-infrared rays from the heating medium through the interior side transparent member of the two transparent members.

[3] The solar energy utilization system according to [2],
in which the interior side transparent member of the two-layer structure is installed to be at least partially included in a height from an upper end to a lower end of the solar heat collector.

[4] The solar energy utilization system according to [2], further including:
an outdoor side transparent member (outer glass 10) that is provided on an outer side from the solar heat collector, and has a two-layer structure for introducing the heating medium from the solar heat collector to the inside when a temperature of the heating medium from the solar heat collector reaches a predetermined temperature or higher.

Although the present invention has been described in detail and with reference to specific embodiments, it is apparent to those skilled in the art that various changes and modifications can be made without departing from the spirit and scope of the present invention.

According to the present invention, the effect of providing a solar energy utilization system capable of improving the interior heat insulation while securing the availability of solar energy is exhibited. The present invention exhibiting the effect is useful for a solar energy utilization system capable of improving energy saving performance.

What is claimed is:

1. A solar energy utilization system comprising:
   an energy receiver that is provided inside with respect to a transparent portion of a building and takes in solar energy to obtain at least one of electrical energy and thermal energy;
   an interior side transparent member that is provided on the interior side of the building with respect to the energy receiver; and
   an energy utilization device using energy from the energy receiver in the interior side, wherein
   the interior side transparent member is subjected to a process so that both an absorptivity and emissivity and a transmittance of far-infrared rays with at least a wavelength of 9 µm or longer and to 10 µm or shorter are 20% or less.

2. The solar energy utilization system according to claim 1, wherein
   the energy receiver is a solar heat collector that takes in solar energy and heats a heating medium to obtain thermal energy,
   the interior side transparent member is a transparent member having a two-layer structure capable of introducing the heating medium from the solar heat collector inside, a transparent member of the two transparent members on the solar heat collector side is subjected to the process and is used as the energy utilization device that radiates far-infrared rays from the heating medium through the interior side transparent member of the two transparent members.

3. The solar energy utilization system according to claim 2, wherein
   the interior side transparent member of the two-layer structure is installed to be at least partially included in a height from an upper end to a lower end of the solar heat collector.

4. The solar energy utilization system according to claim 2, further comprising:
   an outdoor side transparent member that is provided on an outer side from the solar heat collector, and has a two-layer structure for introducing the heating medium from the solar heat collector to the inside when a temperature of the heating medium from the solar heat collector reaches a predetermined temperature or higher.

5. The solar energy utilization system according to claim 2, further comprising:
   at least one pipe that is configured to provide the heating medium from the solar heat collector to the interior side transparent member;
   a heat exchanger; and
   a valve that is provided with the at least one pipe and configured to switch a flow path of the heating medium between a first path from the solar heat collector to the interior side transparent member, and a second path from the solar heat collector to the heat exchanger.

* * * * *